United States Patent [19]

Kang

[11] Patent Number: 4,875,123
[45] Date of Patent: Oct. 17, 1989

[54] ADJUSTABLE AUDIO CONTROL-ERASER AND TAPE GUIDE ASSEMBLY FOR A CASSETTE TAPE VIDEO TAPE RECORDER

[75] Inventor: Sung S. Kang, Suwon, Rep. of Korea

[73] Assignee: Gold Star Co., Ltd., Seoul, Rep. of Korea

[21] Appl. No.: 298,270

[22] Filed: Jan. 17, 1989

Related U.S. Application Data

[63] Continuation of Ser. No. 939,959, Dec. 10, 1986, abandoned.

[30] Foreign Application Priority Data

Dec. 10, 1985 [KR] Rep. of Korea ............... 16527/1985

[51] Int. Cl.⁴ .............................................. G11B 5/56
[52] U.S. Cl. ................................... 360/109; 360/105
[58] Field of Search ................ 360/75, 76, 88, 90, 360/93, 96.4, 104, 105, 106, 109

[56] References Cited

U.S. PATENT DOCUMENTS

| | | | |
|---|---|---|---|
| 3,943,569 | 3/1976 | Bettini et al. | 360/105 |
| 4,307,426 | 12/1981 | Aldenhoven | 360/109 |
| 4,506,857 | 3/1985 | Hara et al. | 360/109 X |
| 4,589,040 | 5/1986 | Kawase | 360/109 |

FOREIGN PATENT DOCUMENTS

| | | | |
|---|---|---|---|
| 0067901 | 5/1980 | Japan | 360/137 |
| 0078619 | 5/1982 | Japan | 360/109 |
| 0014316 | 1/1983 | Japan | 360/109 |
| 0207001 | 1/1984 | Japan | 360/137 |
| 0195718 | 10/1985 | Japan | 360/109 |

Primary Examiner—Robert S. Tupper
Assistant Examiner—Andrew L. Sniezek
Attorney, Agent, or Firm—Birch, Stewart, Kolasch & Birch

[57] ABSTRACT

An adjustable audio control eraser and tape guide assembly for a cassette type video recorder comprising a housing, a tape cassette disposed in a front portion of the housing, and an audio control eraser and tape guide assembly disposed in rear portion thereof, the audio control eraser and tape guide assembly being provided with a motor member disposed therebelow. This assembly provides for a slim type of VCR and allows for a shortening of the time period for assembly.

1 Claim, 3 Drawing Sheets

ADJUSTABLE AUDIO CONTROL-ERASER AND TAPE GUIDE ASSEMBLY FOR A CASSETTE TAPE VIDEO TAPE RECORDER

This application is a continuation of application Ser. No. 939,959 filed on Dec. 10, 1986, now abandoned.

BACKGROUND OF THE INVENTION

The present invention relates to an adjustable audio control-eraser and a tape guide assembly for a cassette type video tape recorder (hereinafter, referred to as VCR) and more particularly, to an incorporated construction of an audio control-eraser head member (hereinafter, referred to as ACE head member) and tape guide assembly which is directly disposed over a capstan motor for providing a slim type VCR.

As is well known, in video tape recorders a capstan is installed in the vicinity of the mouth of tape cassette, but this prevents the construction of a slimmer VCR and disadvantageously affects assemblage. Also, a fly wheel or a motor for driving a capstan is installed below a reel table. However, it is particularly difficult to adopt a direct driving mode.

In another conventional VCR, a capstan is intalled on a main base plate apart from a tape cassette. However, since the capstan motor is installed under the main base plate and an ACE head member and tape guide are installed thereon, this causes a bad effect on its assemblage and a high cost because of the increase in the number of components needed.

SUMMARY OF THE INVENTION

It is therefore an object of the present invention to provide an incorporated construction of an AC head member and tape guide assembly which provides a slim type VCR and allows for a much easier assemblage.

It is another object of the present invention to provide an ACE head member which is varied in its inclination and provided an easy X-distance adjustment, i.e., an adjustment of the distance from a point of the tape being departed from a head drum to an audio control head.

The above objects of this invention may be achieved by an incorporated construction of a cassette type video tape recorder comprising a stator yoke secured to a plurality of bosses by bolts which are integrally formed on a main base plate together with a printed circuit board; a motor underlaying the printed circuit board and having a stator and a rotator with an axis which passes through the stator, the printed circuit board, the stator yoke and a flange disposed on the stator yoke; a head base having an end portion fixed on an end portion of the flange by means of a tape guide with a guide post which is mounted to the flange and with a coil spring around its lower portion together with a nut, and the other end portion fixed on the stator yoke by a screw through the medium of a bushing, the other end portion of the flange being mounted with another tape guide which has a guide post and a coil spring around its lower portion; a head plate having an ACE head member fixed thereon and secured with a first screw which has a coil spring disposed around its upper portion and second and third screws which face to the first screw and to the ACE head member, respectively; and a trigonal pyramid shape protrusion integrally formed on the head base for serving as means for supporting the head plate to make an inclination of the ACE member in the direction toward the first screw or the ACE member by tightening or loosening the second and third screws.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objections of the present invention will be apparent from the following description taken in connection with the appended drawings which are given by way of illustration only, and thus, are not limitative of the present invention, and in which.

BEST MODE FOR CARRYING OUT THE INVENTION

Figure 1:
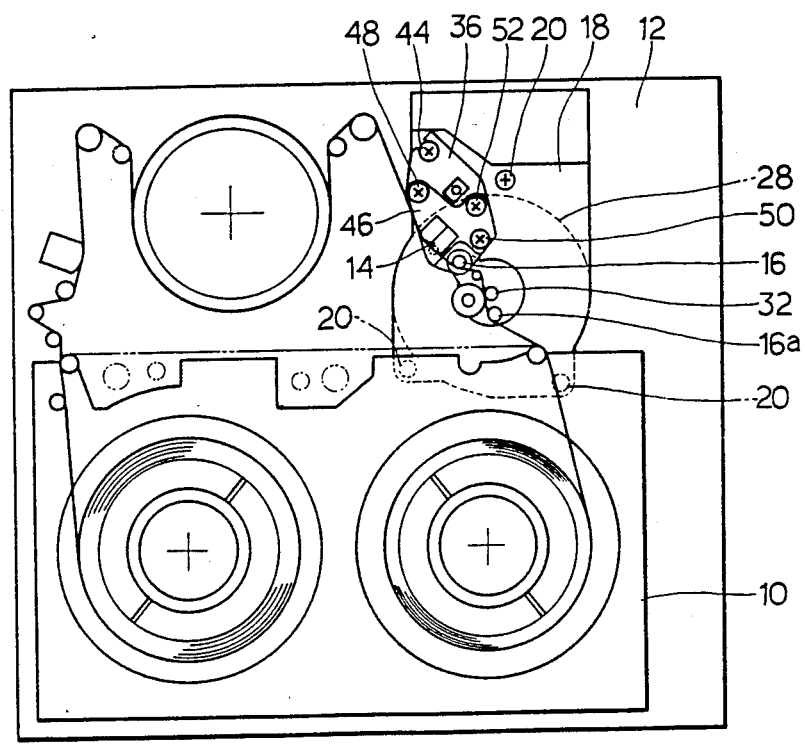
FIG. 1 is a schematic plan view of a travelling system of the VCR in which the incorporated construction according to the present invention is installed.

Referring to FIG. 1, there is shown a plan view of a travelling systemm of a VCR in which a tape cassette 10 is positioned on a main base plate 12. An incorporated construction according to the present invention includes an ACE head member 14 and tape guides 16 and 16a installed on the main base plate 12 apart from the tape cassette 10.

Figure 2:
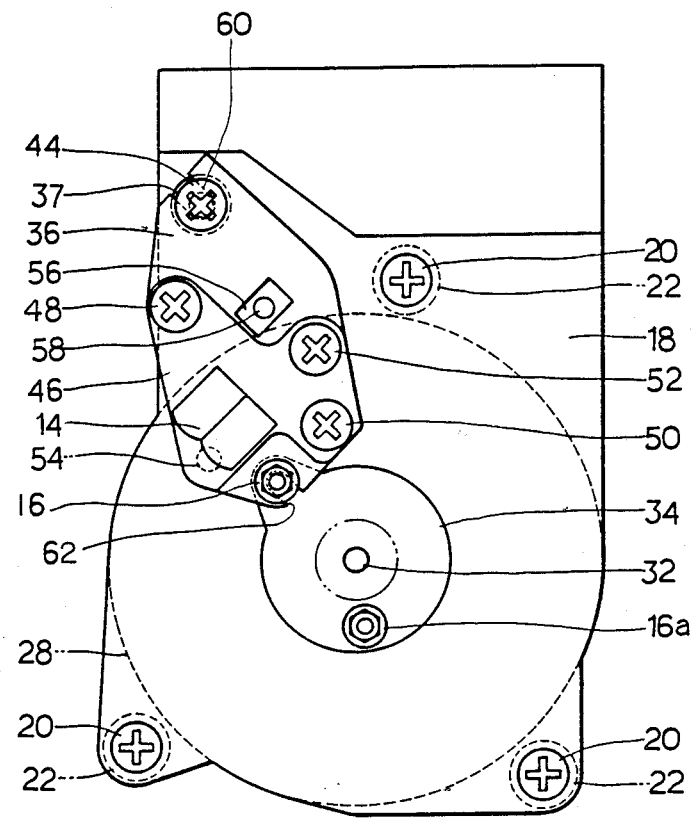
FIG. 2 is a schematic plan view of the subject portions of the present invention.
Figure 3:
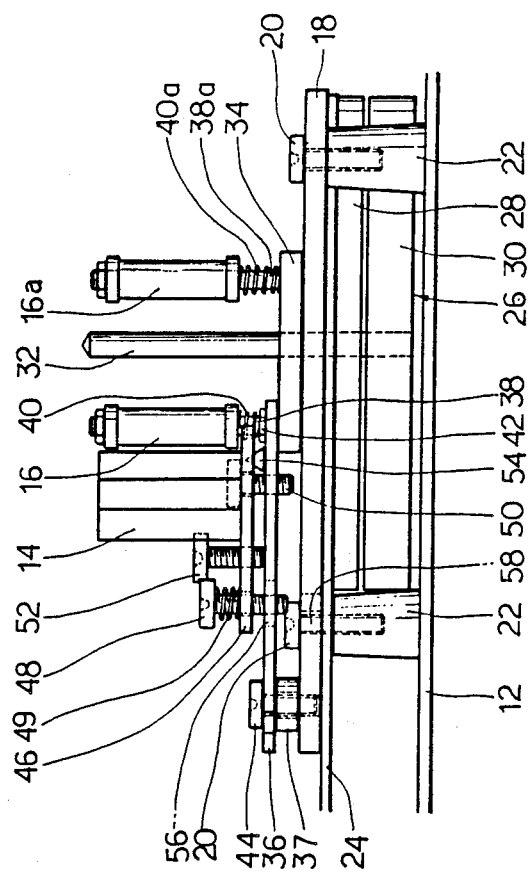
FIG. 3 is a side elevational view of the structure shown in FIG. 2 with parts partially broken away.

Referring to FIGS. 2 and 3 showing in detail a preferred embodiment of the present invention, a stator yoke 18 is secured onto bosses 22 by bolts 20, wherein the bosses 22 are integrally formed on the main base plate 12 together with a printed circuit board 24. A motor 26 underlaying the printed circuit board 24 includes a stator 28 and a rotor 30 through an elongated member 32 by piercing the stator 28, the printed circuit board 24, the stator yoke 18 and a flange 34 disposed on the stator yoke 18 in this order. A head base 36 is disposed on the flange 34 and a bushing 34. One end portion of the head base 36 is fixed on an end of the flange 34 by means of a guide post 38 mounted through a nut 42 which both act as a second connection device. A coil spring 38 is wound around the guide post 38. The other end portion thereof is supported on the bushing 37 by a screw 44 which acts as a first connection device. The other end of the flange 34 is connected to the tape guide 16a extends along guide post 40a and coil spring 38a is wound around the guide post 40a. A head plate 46 for the ACE head member 14 is fixed on the head base 36 by a first screw 48 having a coil spring 48 wound around the upper portion thereof and second and third screws 50 and 52 for facing to the first screw 48 and to the ACE head member 14, respectively. The head base 36 is provided with a trigonal pyramide shape protrusion 54 formed integrally therewith which serves as means for supporting the head plate 46 to make an incllination of the ACE head member 14 in the direction toward the first screw 48 or the ACE head member 14 by tightening or loosening the second and third screws 50 and 52. As it were, by tightening or loosening the second and third screws 50 and 52 about the protrusion 54 and biasing force of the coil spring 49, the inclination of the head plate 46 can be varied in the direction which is wanted, and thereby the inclination of the ACE head member 14 fixed thereto can be varied.

Further, a distance in a beeline from a point of the tape being departed from a head drum to the audio control head (hereinafter, referred to as "X-distance") can be adjusted by means of a proper instrument, for instance, an eccentric driver. A main stem and an eccentric stem diverted therefrom of the eccentric driver can be inserted into a rectangular opening 56 and a hole 58 formed on the head base 36 and the stator yoke 18, respectively. And then by loosening a screw 44 and the nut 42 and rotating the main stem of eccentric driver, the head base 36 can be moved in horizontal since the screw 44 and the nut 42 are carried on V-shape (or elongated) openings 60 and 62, respectively. Thereby, the audio control head member 14 fixed to the head plate 46 which is connected with the head base 36 can be moved and thus the X-distance can be adjusted. After adjusting the X-distance, the head-base 36 is again made stationary by tigtening the screw 44 and nut 42.

As set forth hereinabove, the incorporated construction onto a capstan motor according to the present invention provides a slim type VCR and saves time for assembly.

It is to be understood that the form of my invention herein shown and described is to be taken as a preferred example of the same and that various changes and modifications may be resorted to without departing from the spirit of my invention or the scope of the subjoined claims.

I claim:

1. An adjustable audio control eraser and tape guide assembly for a cassette type video recorder which comprises:
   a housing having a main base plate;
   a tape cassette disposed on the front portion of said main base plate; and
   an audio control eraser and tape guide assembly disposed on the rear portion of said main base plate, said assembly including:
   a printed circuit board supported on said main base plate,
   a motor member underlying said printed circuit board, said motor member having a rotator and a stator attached thereto,
   a stator yoke attached to said printed circuit board,
   an elongated member passing through said stator yoke, said printed circuit board, and said stator and attached to said stator,
   a head base connected to said stator yoke through a bushing by a first connection device at a first end portion of said head base and to a stator yoke flange disposed on said stator yoke by a second connection device at a second end portion of said head base, said stator yoke flange being provided with a first tape guide and a second tape guide one of said tape guides being disposed on each end portion of said stator yoke flange, respectively, said head base having elongated openings at said first and second end portions thereof through which said respective first and second connection devices pass,
   a head plate having an adjustable audio control eraser head member disposed thereon said head plate being connected to said head base by first, second, and third screws, said first screw having a coil spring wound around an upper portion thereof for biasing said head plate with respect to said head base, and said second and third screws coacting with said first screw for movement of said head plate with said audio control eraser head member, upon tightening or loosening of the second or third screws,
   a trigonal pyramide shaped protrusion integrally formed on said head base for inclining said audio control eraser head member with respect to said first screw by tightening or loosening said second and third screws, and
   a rectangular opening disposed on said head base and aligned with a hole disposed on said stator yoke for adjusting said head base along with the head plate and audio control eraser head member by applying a rotational force thereto, said head base, head plate and audio control eraser head member being moved in a generally horizontal direction during the adjusting after said first and second connection devices are loosened and the rotational force is applied, said elongated openings in said head base accommodating movement of said head base whereafter said first and second connection devices are tightened to restrain further movement of said head base, whereby the assembly provides for a slim type cassette type video recoder and for ready adjustment in positioning of said audio control eraser head member.

* * * * *